US006596383B2

United States Patent
Matsuo et al.

(10) Patent No.: US 6,596,383 B2
(45) Date of Patent: *Jul. 22, 2003

(54) FILM FOR USE IN INTERMEDIATE IMAGE TRANSFER MEMBER AND METHOD OF PRODUCING ENDLESS-BELT-SHAPED FILM

(75) Inventors: Minoru Matsuo, Kanagawa (JP); Hideki Komatsu, Kanagawa (JP); Akiko Tanaka, Kanagawa (JP); Yuichi Jibiki, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,526

(22) Filed: Sep. 8, 1999

(65) Prior Publication Data
US 2002/0172819 A1 Nov. 21, 2002

(30) Foreign Application Priority Data

Sep. 8, 1998 (JP) ............................................. 10-270559
Aug. 10, 1999 (JP) ............................................. 11-226277

(51) Int. Cl.$^7$ .............................. B32B 7/02; B32B 3/00; B32B 7/14; G03G 15/00; G03G 13/14
(52) U.S. Cl. ..................... 428/212; 428/192; 428/195; 428/204; 430/64; 430/126; 430/131
(58) Field of Search .................. 430/126, 131, 430/64; 428/195, 204, 192, 212

(56) References Cited

U.S. PATENT DOCUMENTS 5,139,906 A * 8/1992 Dol et al. .................. 430/58
5,182,159 A * 1/1993 Yamauchi et al. ........... 428/192

FOREIGN PATENT DOCUMENTS

| JP | 9-034269 | 2/1997 |
| JP | 9-218588 | 8/1997 |
| JP | 10-270559 | 9/1998 |
| JP | 11-109761 | 4/1999 |
| JP | 11-226277 | 8/1999 |

* cited by examiner

Primary Examiner—Cynthia H. Kelly
Assistant Examiner—Lawrence Ferguson
(74) Attorney, Agent, or Firm—Oblon, Spivak, McClelland, Maier & Neustadt, P.C.

(57) ABSTRACT

A film is made of an insulating matrix resin and an electroconductive material, in which the electroconductive material is dispersed in the insulating matrix resin in such a manner that a surface resistivity of A [Ω] of the film and a volume resistivity of B [Ω·cm] of the film in the direction of a thickness thereof normal to the surface of the film satisfy a relationship of: A>B, and when the film has a thickness of T [cm], the electroconductive material is dispersed in the insulating matrix resin in such a manner that the surface resistivity of A [Ω] of the film and the volume resistivity of B [Ω·cm] of the film satisfy a relationship of: A [Ω]×T [cm]>B [Ω·cm]. This film can be prepared by a centrifugal molding method.

15 Claims, 8 Drawing Sheets

EXTERNAL SURFACE a > b

EXTERNAL SURFACE m = m'   n = n'

EXTERNAL SURFACE m < n

φ50±0.5
φ70±0.5
φ80±0.5

φ83±2

VOLUME RESISTIVITY TEST

FACE ELECTRODE — GUARD
BACK ELECTRODE +

SURFACE RESISTIVITY TEST

FACE ELECTRODE + —
BACK ELECTRODE GUARD

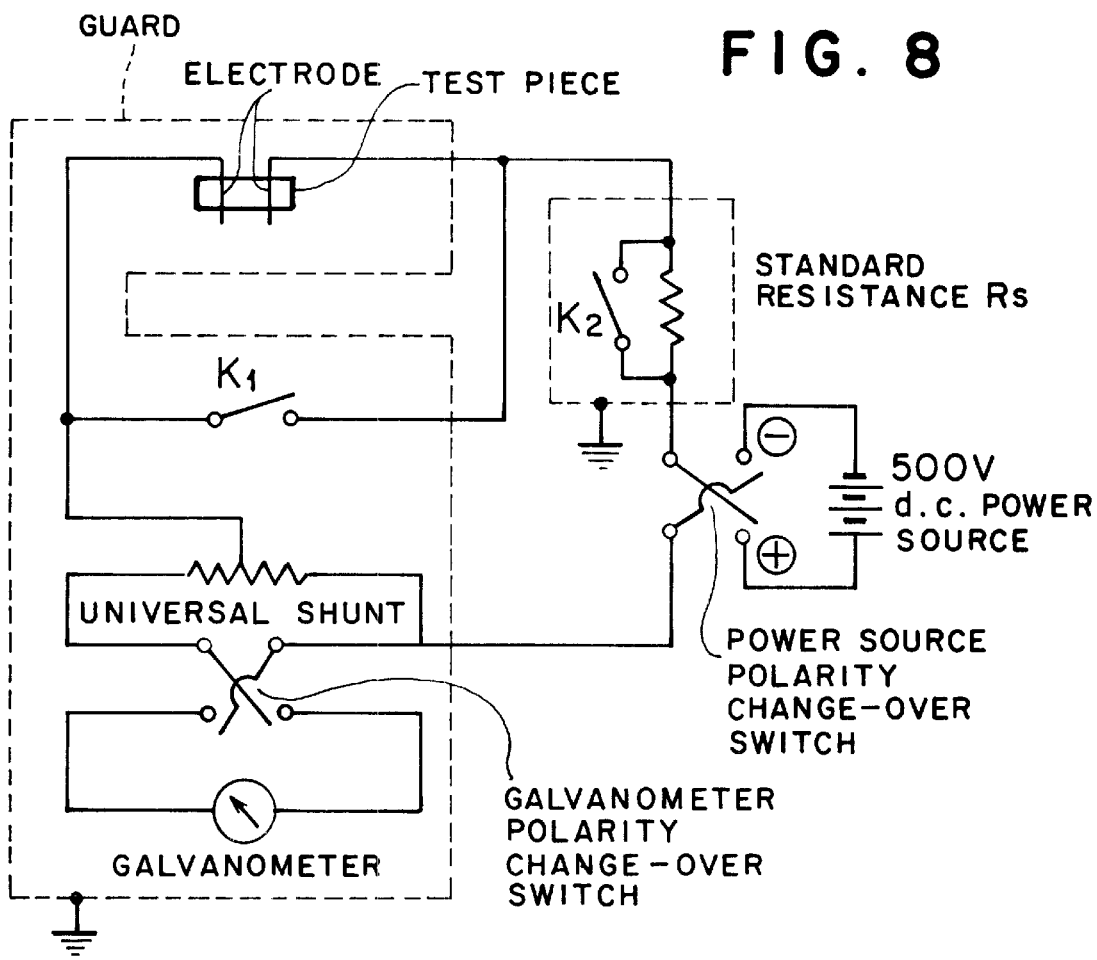

$D_1$ = APPROX. 26 mm to 36 mm,
$D_2$ = APPROX. 38 mm,
$D_3$ = APPROX. 48 mm

FILM FOR USE IN INTERMEDIATE IMAGE TRANSFER MEMBER AND METHOD OF PRODUCING ENDLESS-BELT-SHAPED FILM

BACKGROUND OF THE INVENTION

1. Field of the Invention

The present invention relates to a film adopted for use in an intermediate image transfer member, which may be used in the form of an endless belt, to which a toner image can be transferred, and which is capable of reducing the formation of image transfer dust and the deposition of toner on the background of images in an image formation process.

The present invention also relates to an endless-belt-shaped film made of the above-mentioned film for use in the intermediate image transfer member.

2. Discussion of Background

Conventionally, there is known an image formation apparatus in which a latent electrostatic image is formed on a latent image bearing member such as a photoconductor drum, the latent electrostatic image is developed with toner to a visible toner image, the visible toner image is then electrostatically transferred to an endless-belt-shaped intermediate image transfer belt, and the toner image is further transferred from the intermediate image transfer belt to a recording material such as a transfer sheet.

In this kind of image formation apparatus, an electroconductive intermediate image transfer belt is widely used as the above-mentioned intermediate image transfer belt.

However, it is difficult to set the surface resistivity of the electroconductive intermediate image transfer belt at an appropriate value. For example, in Japanese Patent 2560727, it is described that proper images can be formed when the surface resistivity of the electroconductive image transfer image transfer belt is in a range of $10^7$ to $10^{15}$ [$\Omega/\square$]. However, there is a case where the deposition of toner on the background of images occurs and image transfer dust is formed, with a toner being transferred away from its right image transfer position even when the surface resistivity of the electroconductive image transfer belt is set in the above-mentioned range. It is also known that such image transfer dust occurs frequently when an intermediate image transfer belt with lower surface resistivity is used. Such image transfer dust is considered to be caused by the electric lines of force, formed between the intermediate image transfer belt and the latent electrostatic image bearing member, being disturbed in the direction of the surface of the intermediate image transfer belt. Furthermore, it is known that the deposition of toner on the background of images occurs frequently when an intermediate image transfer belt with higher surface resistivity is used. Thus, there is a dilemma in which when the surface resistivity of the intermediate image transfer belt is increased in order to reduce the formation of the image transfer dust, the deposition of toner on the background of images is increased, while when the surface resistivity of the intermediate image transfer belt is decreased in order to reduce the deposition of toner on the background of images, the occurrence of the image transfer dust is promoted.

In order to get out from such a dilemma, it will be necessary to set the surface resistivity of the intermediate image transfer belt at a high surface resistivity and also to provide a charge quenching unit for quenching electric charges of the intermediate image transfer belt. However, the provision of such a charge quenching unit not only makes the image formation apparatus costly, but also makes the mechanism of the image formation apparatus complex. Therefore, the provision of the quenching apparatus is not a preferable step from the above point of view. Furthermore, a corona charger, which is one of the simplest quenching apparatus, is considered to be usable for the above-mentioned purpose. However, the corona charge has a shortcoming that it generates ozone and causes an air pollution problem.

SUMMARY OF THE INVENTION

It is therefore a first object of the present invention to provide a film with a single layer structure, which can be adopted for use in an intermediate image transfer member, and may be used in the form of an endless belt, to which a toner image can be transferred, and which is capable of reducing the formation of image transfer dust and the deposition of toner on the background of images in an image formation process, without the necessity for the provision of any charge quenching apparatus.

A second object of the present invention is to provide a method of producing an endless-belt-shaped film made of the above-mentioned film for use in the intermediate image transfer member.

The first object of the present invention can be achieved by a film which comprises an insulating matrix resin and an electroconductive material, in which the electroconductive material is dispersed in the insulating matrix resin in such a manner that a surface resistivity of A [$\Omega$] of the film and a volume resistivity of B [$\Omega \cdot cm$] of the film in the direction of a thickness thereof normal to the surface of the film satisfy a relationship of:

$A > B.$

The first object of the present invention can also be achieved by a film comprising an insulating matrix resin and an electroconductive material, having a thickness of T [cm], the electroconductive material being dispersed in the insulating matrix resin in such a manner that a surface resistivity of A [$\Omega$] of the film and a volume resistivity of B [$\Omega \cdot cm$] of the film in the direction of a thickness thereof normal to the surface of the film satisfy a relationship of:

$A[\Omega] \times T[cm] > B[\Omega \cdot cm].$

In any of the above films, the electroconductive material may comprise a first electroconductive material and a second electroconductive material, each of which has a different resistivity.

Furthermore, in any of the above films, the electroconductive material may comprise a first electroconductive material and a second electroconductive material, each of which has a different particle size.

Furthermore, in any of the above films, the electroconductive material may be in the shape of needles.

Each of the needles of the electroconductive material may be in such a shape that the thickness thereof is decreased toward opposite end portions thereof.

As the above-mentioned electroconductive material, an electroconductive material comprising carbon can be used.

The first object of the present invention can also be achieved by a film with a single layer structure comprising a first region extending along a surface of the film and a second region extending under the first region, the first region comprising an insulating matrix resin and a first electroconductive material dispersed in the form of particles in the insulating matrix resin, and the second region comprising the insulating matrix resin and a second electroconductive material dispersed in the form of particles in the insulating matrix resin, the first electroconductive material having a lower electroconductivity than that of the second electroconductive material.

Furthermore, the first object of the present invention can also be achieved by a film with a single layer structure comprising a first region extending along a surface of the film and a second region extending under the first region, the first region comprising an insulating matrix resin and a first electroconductive material dispersed in the insulating matrix resin, and the second region comprising the insulating matrix resin and a second electroconductive material dispersed in the insulating matrix resin, the first electroconductive material and the second electroconductive material being of an identical electroconductive material, and the first electroconductive material having a larger particle size than that of the second electroconductive material.

Furthermore, the first object of the present invention can also be achieved by a film with a single layer structure comprising an insulating matrix resin and an electroconductive material dispersed in the form of needles in the insulating matrix resin, with a longitudinal side of the needles of the electroconductive material being oriented in the direction normal to an external surface of the film.

In the above film, it is preferable that a cross section of each of the needles of the electroconductive material, in the direction normal to the external surface of the film, be in the shape of a quadrilateral with unequal diagonal lines, a longer diagonal line being oriented in the direction normal to the external surface of the film and a shorter diagonal line being oriented in the direction normal to the longer diagonal line.

Furthermore, it is preferable that the above quadrilateral have a pair of equal adjacent sides directed to the external surface of the film, and a pair of equal adjacent sides directed to a back side of the film.

Furthermore, it is also preferable that the pair of equal adjacent sides of the quadrilateral directed to the external surface of the film be shorter than the pair of equal adjacent sides of the quadrilateral directed to the back side of the film.

The second object of the present invention can be achieved by a method of producing an endless-belt-shaped film with a single layer structure comprising an insulating matrix resin and an electroconductive material dispersed in the form of particles in the insulating matrix resin, with larger particles of the electroconductive material being positioned on the side of an external surface of the endless-belt-shaped film, and smaller particles of the electroconductive material being positioned on the side of an inner surface of the endless-belt-shaped film, comprising the steps of:

dispersing the electroconductive materials with different particles size in a solution of the matrix resin in a solvent to form a dispersion of the electroconductive materials in the solution of the matrix resin, and
  subjecting the dispersion to centrifugal molding to localize larger particles of the electroconductive material on the side of the external surface of the endless-belt-shaped film, and to localize smaller particles of the electroconductive material on the side of the inner surface of the endless-belt-shaped film, with removal of the solvent therefrom.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a diagram in explanation of an insulation resistance measuring apparatus specified in (1.1) in JIS K6911 5.13.1.

FIG. 9 is a diagram in explanation of a measuring method of surface resistivity specified in JIS R 3256 3.

DESCRIPTION OF THE PREFERRED EMBODIMENTS

Figure 1:
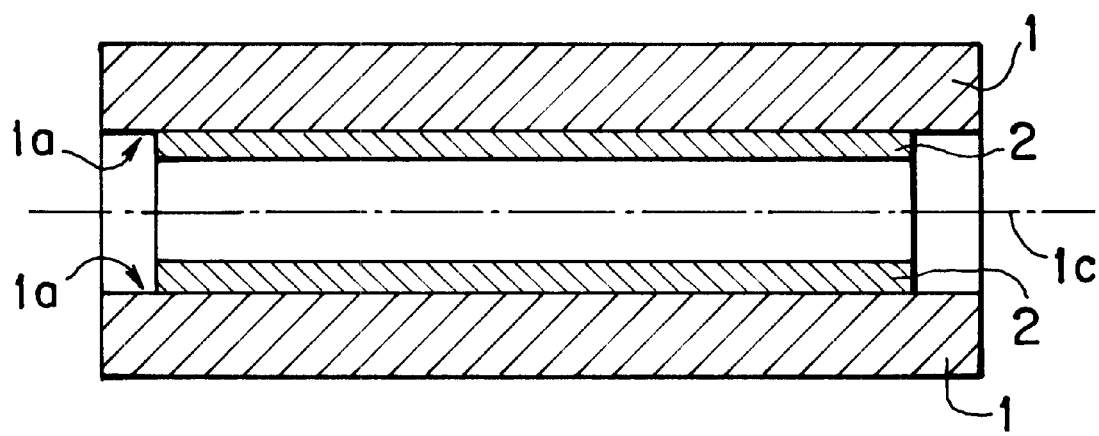
FIG. 1 is a schematic cross-sectional view of a centrifugal molding cylinder 1 for forming an endless-belt-shaped film serving as an intermediate image transfer belt on a molding surface thereof by centrifugal molding.

In an image formation process using an image transfer belt to which a toner image is transferred, when the electric resistivity in the direction of an image transfer surface of the image transfer belt is different from that in the direction of the thickness of the image transfer belt, the electric resistivity in the direction of the surface of the image transfer belt determines the degree of the disturbance or deformation of the arrangement of the electric lines of force in the direction of the surface of the image transfer belt, which electric lines of force are formed between a latent image bearing member which bears the toner image and the image transfer belt before the transfer of the toner image. Furthermore, the electric resistivity in the direction of the thickness of the image transfer belt determines the degree of the easiness of the flow of electric charges remaining on the image transfer surface of the belt to a non-image transfer surface of the belt, that is, the easiness of the grounding of the image transfer belt. Therefore, by controlling the electric resistivity in the direction of the image transfer surface of the image transfer belt and that in the direction of the thickness of the image transfer belt, the deformation of the arrangement of the electric lines of force in the direction of the surface of the belt, which contribute to the image transfer performance, and the easiness of the grounding to remove the electric charges remaining on the image transfer surface of the belt can be separately adjusted.

In particular, when the electric resistivity in the direction of the image transfer surface of the image transfer belt is greater than that in the direction of the thickness of the image transfer belt, the electric charges on the image transfer surface of the image transfer belt more easily flow in the direction of the thickness of the image transfer belt than in the direction of the surface of the image transfer belt, so that the deformation of the arrangement of the electric lines of force in the direction of the image transfer surface of the image transfer belt can be reduced, and the grounding of the electric charges on the image transfer surface of the image transfer belt can be facilitated.

In a method of forming an endless-belt-shaped film, using a centrifugal molding method, more specifically, in a step of forming the endless-belt-shaped film on a molding surface of a centrifugal molding cylinder by subjecting a base material for the endless-belt-shaped film to centrifugal molding, in which base material an electroconductive material in the form of needles is dispersed, the needles of the electroconductive material can be arranged in such a manner that the longitudinal side of each needle is directed in the direction of the thickness of the belt. In the image transfer belt in which the needles of the electroconductive material, the resistivity in the direction of the surface thereof can be made larger than that in the direction of the thickness thereof.

In particular, when each needle of the electroconductive material is made in such a shape that one half or a top portion of the needle is heavier than the other portion of the needle, the needles of the electroconductive material can be easily arranged in the course of the centrifugal molding in such a manner that the heavier portion of each needle is directed to the image transfer surface of the image transfer belt and the ligher portion of each needle is directed to the back side of the image transfer belt.

Figure 3A:
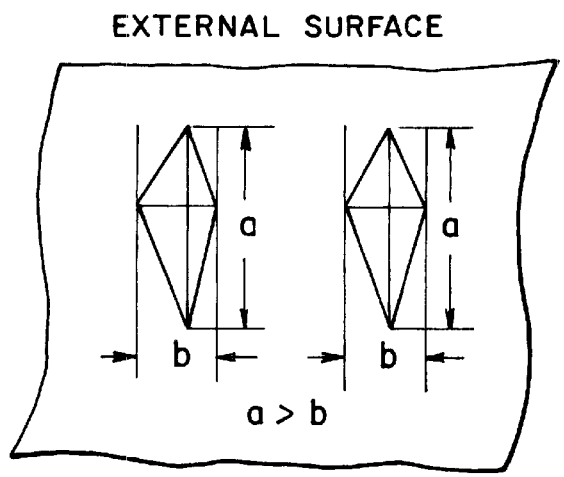
FIGS. 3A to 3C are schematic cross sectional views of needles of an electroconductive material in the endless belt-shaped film, showing varieties of the cross-section of the needles.

More specifically, with reference to FIG. 3A, a cross section of each of the needles of the electroconductive material in the direction normal to the external surface of the film, may be in the shape of a quadrilateral with unequal diagonal lines, a longer diagonal line a being oriented in the direction normal to said external surface of the film and a shorter diagonal line b being oriented in the direction normal to the longer diagonal line $\underline{a}$.

Figure 3B:
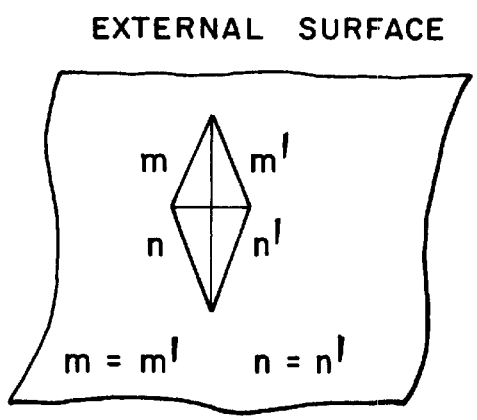

As shown in FIG. 3B, in the above quadrilateral, it is preferable that a pair of adjacent sides thereof $\underline{m}$, $\underline{m}'$ directed to the external surface of the film be equal ($\underline{m}=\underline{m}'$), and that another pair of adjacent sides $\underline{n}$, $\underline{n}'$ thereof directed to a back side of the film be also equal ($\underline{n}=\underline{n}'$).

Figure 3C:
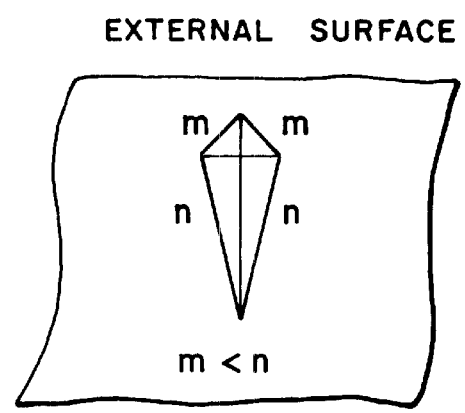
Figure 3D:
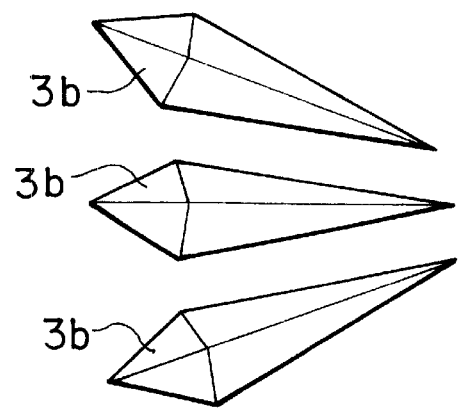
FIG. 3D is a side view of crushed pieces of selenium 3b, showing the shape thereof, used in Example 2.

As shown in FIG. 3C, in the above quadrilateral, it is preferable that the pair of equal adjacent sides m of the quadrilateral directed to the external surface of the film are shorter than the pair of equal adjacent sides n of the quadrilateral directed to a back side of the film (m<n).

FIG. 1 is a schematic cross-sectional view of a centrifugal molding cylinder 1 for forming an endless-belt-shaped film serving as an intermediate image transfer belt by centrifugal molding, which is hereinafter referred to as an endless-belt-shaped intermediate image transfer film 2. The endless-belt-shaped intermediate image transfer film 2 is formed along a molding surface 1a of the centrifugal molding cylinder 1. In FIG. 1, an alternate long and short dash line 1c indicates an axis of rotation of the centrifugal molding cylinder 1 in the course of the centrifugal molding. The centrifugal molding cylinder 1 is made of a metal such as aluminum, with the molding surface 1a being subjected to mirror finish with high precision.

The endless-belt-shaped intermediate image transfer film 2 is formed by centrifugal molding on the molding surface 1a, using polyamide acid or polyamic acid serving as a precursor of polyimide. Polyamide acid has the properties of being converted to a polyimide through imide ring closure.

In the present invention, polyamide acid is used as a starting material for forming the endless-belt-shaped intermediate image transfer film of which base material is polymide.

The base material for the endless-belt-shaped intermediate image transfer film of the present invention is not limited to the above-mentioned polyimide, but, for example, the following materials can be used: polyether sulfone, polycarbonate, polyester, polyarylate, polyphenylene sulfide, polyamide, polysulfone, polyparabanic acid, fluoroplastic, polyamide imide, polyether imide, thermosetting unsaturated polyester, and epoxy thermosetting resin.

Polyamide acid has the properties of performing imide ring closure when dissolved in a particular organic solvent with the application of heat thereto, or in the presence of a catalyst.

A solution of polyamide acid for the formation of polyimide can be obtained by allowing an organic diamine to react with an organic tetracarboxylic acid dianhydride in an equimolar ratio in an organic solvent. In the present invention, a commercially available polyimide precursor solution (Trademark "TORAYNEECE #3000", made by Toray Industries, Inc.) is used as the polyamide acid, and diluted with N,N-dimethyl acetamide (hereinafter referred to as DMAC) appropriately, whereby the polyamide acid solution is prepared.

The organic solvent for dissolving the polyimide precursor which is used in the preparation of the endless-belt-shaped intermediate image transfer film of the present invention, that is, the solvent for dissolving the starting material for forming the endless-belt-shaped intermediate image transfer film, is not limited to CMAC, but any solvents that are capable of dissolving the starting material can be employed. Specific examples of such solvents are γ-butyrolactone, dimethyl formamide, dimethyl sulfoxide, N-methyl-2-pyrrolidone, diethylene glycol dimethyl ether, pyridine, dimethyl sulfone, dichloromethane, trichioromethane, dioxane, and toluene.

The concentration of the starting material in the above solvents is not limited to a particular concentration, provided that it is preferable to appropriately adjust the viscosity of the solution of the starting material for forming the endless-belt-shaped intermediate image transfer film in order to obtain an endless-belt-shaped intermediate image transfer film with excellent surface properties and with an appropriate thickness with high precision.

The preparation of the endless-belt-shaped intermediate image transfer film 2, which will be hereinafter referred to as the endless belt film 2, will now be explained.

The endless belt film 2 composed of polyamide acid serving as the starting material, which includes DMAC and an electroconductive material which will be explained later, is formed on the molding surface 1a of the centrifugal molding cylinder 1 by a conventional centrifugal molding method.

In the centrifugal molding method, the starting material may be first coated on the molding surface 1a of the centrifugal molding cylinder 1, and then the centrifugal molding cylinder 1 is rotated to perform the centrifugal molding. Alternatively, the centrifugal molding cylinder 1 is first rotated, and then the starting material is injected thereinto. The latter method is generally called "centrifugal casting". For producing the endless-belt-shaped film of the present invention, either the former method or the latter method can be equally used.

In the present invention, the former method was used. More specifically, the above-mentioned polyamide acid solution was spray coated on the molding surface 1a of the centrifugal molding cylinder 1 as it was rotated slowly, and the centrifugal molding cylinder 1 was then rotated at a high speed of 1000 rpm around the axis of rotation 1c as shown in FIG. 1, whereby an endless belt film 2 with a thickness of 50 µm was formed.

In the course of the centrifugal molding, it is necessary to continue the rotation of the centrifugal molding cylinder 1 until DMAC is evaporated to some extent from the polyamide acid solution placed on the molding surface 1a in order to prevent the deformation of the endless belt film 2 after the centrifugal molding is finished. The rotating time of the centrifugal molding cylinder 1 can be shortened by applying heat to the polyamide acid solution to promote the evaporation of DMAC as the centrifugal molding cylinder 1 is rotated. In this case, it is preferable that the heat application be controlled so as not to induce excessive imide ring closure in the polyamide acid.

The DMAC still remains in the endless belt film 2 thus produced by centrifugal molding. The DMAC is removed therefrom in the course of the next drying and curing process.

The drying and curing process for the endless belt film 2 will now be explained.

In order to prepare an intermediate image transfer belt from the endless belt film 2 prepared by the centrifugal molding, it is necessary to dry the endless belt film 2, and to cure the same with the inducement of the imide ring closure in the polyamide acid contained in the endless belt film 2. In other words, it is necessary to convert the endless belt film 2 into a cured film made of polyimide which is the base material thereof. In an example of the intermediate endless image transfer belt of the present invention, the endless belt film 2 was dried at a temperature of 100° C.

There are two methods for inducing the imide ring closure in the polyamide acid contained in the endless belt film 2. In one method, a catalyst is used for the inducement of the imide ring closure in the polyamide acid, and in the other method, the polyamide acid is heated. In the formation of the intermediate image transfer belt of the present invention, both methods can be used.

In the example of the intermediate endless image transfer belt of the present invention, the latter method was employed in which the imide ring closure was induced in the polyamide acid by heating the polyamide acid. More specifically, the endless belt film 2 on the molding surface 1a was heated to about 250° C. to induce the imide ring closure in the polyamide acid contained in the endless belt film 2, whereby the endless belt film 2 was cured and changed to a cured film.

As mentioned above, conventionally there is the dilemma that when the surface resistivity of the intermediate image transfer belt is increased in order to reduce the occurrence of the image transfer dust, the deposition of toner on the background of images is increased, while when the surface resistivity of the intermediate image transfer belt is decreased in order to decrease the deposition of toner on the background of images, the occurrence of the image transfer dust is promoted.

The inventors of the present invention have discovered that a solution can be given to the above problem by imparting electric anisotropy to the intermediate image transfer belt. The electric anisotropy specifically means that the electric resistivity in the direction of the intermediate image transfer belt is greater than the electric resistivity in the direction of the thickness of the intermediate image transfer belt.

When a toner image formed on a latent electrostatic image bearing member such as a photoconductor is electrostatically transferred to the intermediate image transfer belt, such electric lines of force that attract the toner image from the latent electrostatic image bearing member to the intermediate image transfer belt are formed between the latent electrostatic image bearing member and the intermediate image transfer belt. However when the electric resistance in the direction of the intermediate image transfer belt is smaller than the electric resistance in the direction of the thickness of the intermediate image transfer belt, the arrangement of the electric lines of force in the direction toward the surface of the intermediate image transfer belt is disturbed, so that the transfer position of the toner image on the intermediate image transfer belt is deviated from its right transfer position and therefore the formation of the image transfer dust is promoted.

On the image transfer surface of the intermediate image transfer belt, there remain electric charges due to the effects of the toner deposited on the image transfer surface of the intermediate image transfer belt and also due to the effects of an electric field therearound. The electric charges remaining on the image transfer surface of the intermediate image transfer belt increase the attraction of the toner to the intermediate image transfer belt. Therefore, unless the quantity of electric charges of the toner on the intermediate image transfer belt is reduced, it is difficult to remove the toner from the surface of the intermediate image transfer belt, so that the cleaning of the intermediate image transfer belt tends to become insufficient and therefore the deposition of the toner on the background of images is caused.

In the present invention, setting the electric resistivity of the intermediate image transfer belt in the direction of the image transfer surface thereof larger than that of the intermediate image transfer belt in the direction of the thickness thereof facilitates the flow of electric charges in the direction of the thickness of the intermediate image transfer belt from the image transfer surface of the intermediate image transfer belt, whereby the deformation of the arrangement of the above-mentioned electric lines of force can be reduced, and the electric charges on the image transfer surface of the intermediate image transfer belt can be easily grounded through the intermediate image transfer belt, and accordingly the formation of the image transfer dust and the deposition of toner on the background of the images can be significantly reduced. Such electric charges are generally grounded, for instance, through a rotating roller which is rotated in sliding contact with a non-image-transfer surface of the intermediate image transfer belt.

Preparation of intermediate image transfer belts with the above-mentioned electric resistance anisotropy will now be explained with reference to the following examples:

EXAMPLE 1

Commercially available fine carbon fibers cut with a length of 5 $\mu$m or less serving as an electroconductive material, and polyamide acid were mixed with a ratio of 0.15:1. This mixture was dispersed in DMAC and diluted with DMAC so as to prepare a polyamide acid solution with a solid component ratio of 30%.

The thus prepared polyamide acid solution was subjected to centrifugal molding on the molding surface 1a of the centrifugal molding cylinder 1. In the course of the centrifugal molding, the cut carbon fibers in the polyamide acid solution were moved toward the molding surface 1a, with the longitudinal direction thereof being directed so as to be in parallel with the direction of the centrifugal force in the peripheral radius direction by the centrifugal force of the rotating molding surface 1a of the centrifugal molding cylinder 1.

Figure 2:
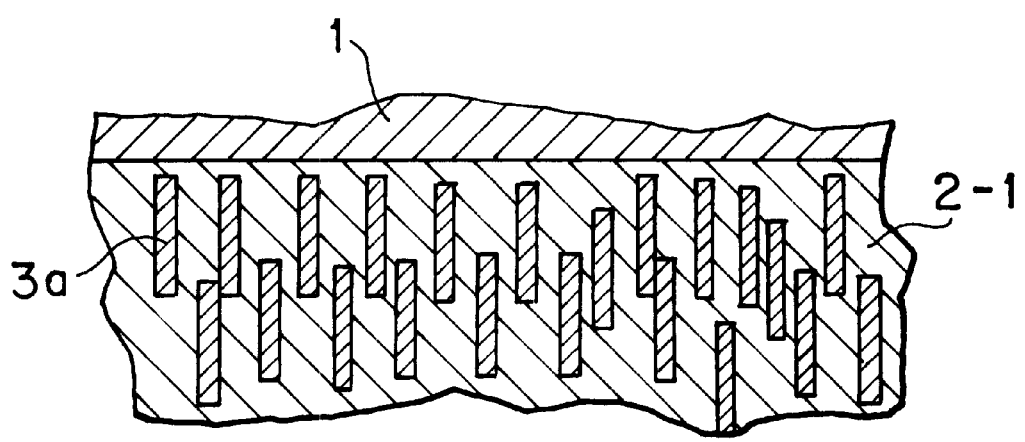
FIG. 2 is a schematic partial cross-sectional side view of an endless belt film 2-1 prepared in Example 1, using the centrifugal molding cylinder 1.

FIG. 2 is a schematic partial cross-sectional view of an endless belt film 2-1 thus prepared in Example 1, which was formed in the centrifugal molding cylinder 1.

As shown in FIG. 2, in the course of the movement of the carbon fibers, carbon fibers 3a in the endless belt film 2-1 were oriented with the longitudinal direction thereof being directed in the direction of the thickness of the endless belt film 2-1.

The thus molded endless belt film 2-1 was dried and cured, whereby an intermediate image transfer belt was prepared.

The thus prepared intermediate image transfer belt was incorporated in a commercially available full-color copying machine (Trademark "PRETER", made by Ricoh Company, Ltd.) and color copies were made. The result was that high quality color images free from image transfer dust and the deposition of toner on the background of images were obtained. In this full-color copying machine, each toner color image formed on a photoconductor drum was transferred to the intermediate image transfer belt, using electrostatic force, in a superimposed manner to prepare the full-color image.

The electric resistance in the direction of an external surface of the intermediate image transfer belt prepared in Example 1 measured about $10^9$ $\Omega$, while the electric resistance in the direction of a thickness of the intermediate image transfer belt measured $5\times10^6$ $\Omega$.

A volume resistivity [$\Omega\cdot$cm] of the intermediate image transfer belt in any examples including this example can be determined by multiplying the electric resistance [$\Omega$] in the direction of the thickness of the intermediate image transfer belt by the thickness of the intermediate image transfer belt, 50 $\mu$m.

EXAMPLE 2

In this example, as the electroconductive material, a material prepared by crushing spherulites of selenium to a grain size of 1 $\mu$m or less was employed.

Spherulite is a kind of crystalline structure observed in many kinds of polymeric materials. Spherulites are radial aggregates of spherical polycrystals composed of crystals of ortho-rhombic system or crystals of monoclinic system. Each crystal in the spherulites grows in a radial direction, so that each crystal is in such a shape that its width increases outwards from a central point, or in the shape of a wedge. Therefore, each crystal has its center of gravity shifted toward an outer side in the longitudinal direction thereof. In other words, when the spherulites are crushed and separated in the longitudinal direction of each crystal, wedge-shaped pieces of the electroconductive material are formed, having a heavier end portion and a lighter end portion.

As a matter of fact, it was confirmed that crushed pieces of selenium 3b, which were obtained by crushing crystallized selenium to a grain size of 1 $\mu$m or less, were in a different shape from that of the cut carbon fibers employed in Example 1, each of which was in the shape of a whisker. More specifically, FIG. 3 shows the shape of each of the crushed pieces of selenium 3b, which is a side view of the crushed pieces of selenium 3b. As shown in FIG. 3, it was confirmed that each of the opposite ends of the crushed piece of selenium 3b has the shape of a cone by SEM inspection. Each of the spherulites of selenium before the spherulites were crushed had a grain size of about 50 $\mu$m.

The crushed pieces of selenium 3b and polyamide acid were mixed with a ratio of 0.20:1. This mixture was dispersed in DMAC and diluted with DMAC so as to prepare a polyamide acid solution with a solid component ratio of 30%.

The thus prepared polyamide acid solution was subjected to centrifugal molding on the molding surface 1a of the centrifugal molding cylinder 1. In the course of the centrifugal molding, the crushed pieces of selenium 3b in the polyamide acid solution were moved toward the molding surface 1a, with the heavier cone-shaped end portion thereof (the cone-shaped end portion of the piece of selenium 3b on the left side in FIG. 3) being directed to the molding surface 1a of the centrifugal molding cylinder 1, by the centrifugal force of the rotating molding surface 1a of the centrifugal molding cylinder.

Figure 4:
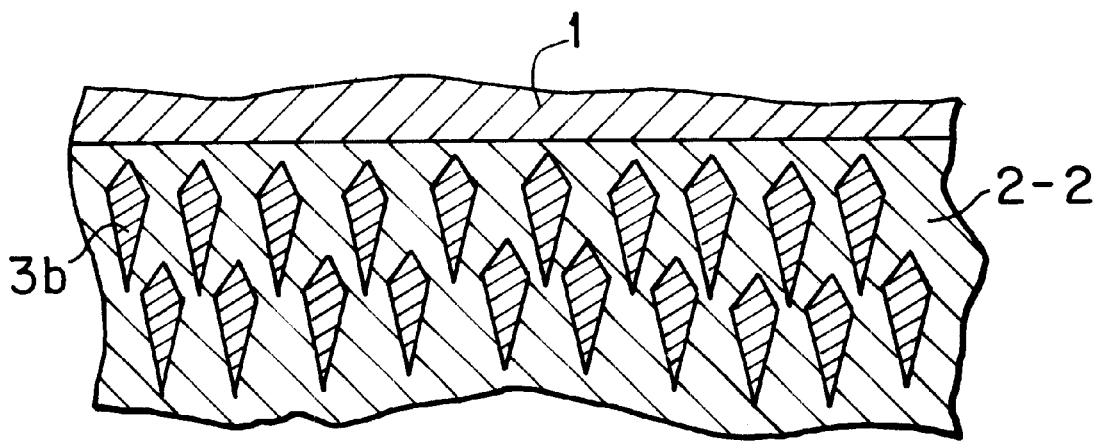
FIG. 4 is a schematic partial cross-sectional view of an endless belt film 2-2 prepared in Example 2, using the centrifugal molding cylinder 1.

FIG. 4 is a schematic partial cross-sectional view of an endless belt film 2-2 thus prepared in Example 2, which was formed in the centrifugal molding cylinder 1. As shown in FIG. 4, in the course of the movement of the crushed pieces of selenium 3b, the crushed pieces of selenium 3b in the endless belt film 2 were oriented with the longitudinal direction thereof being directed in the direction of the thickness of the endless belt film 2.

The movement of such an electroconductive material and the orientation thereof with the longitudinal direction thereof being directed in the direction of the thickness of the endless belt film in the course of the centrifugal molding is not limited to the grains of the electroconductive material having such a cone-shaped end portion on the opposite sides thereof as in the above-mentioned crushed pieces of selenium 3b, but the above-mentioned movement can also occur in any grains of the electroconductive material if each of the grains has a heavier end portion and a lighter end portion in a longitudinal direction thereof.

In the case of the endless belt film 2-2 shown in FIG. 4, the grains of the electroconductive material were more easily arranged so as to be directed in the direction of the thickness of the endless belt film 2-2 than in the case of the endless belt film 2-1 shown in FIG. 2 in Example 1.

The thus molded endless belt film 2-2 was dried and cured, whereby an intermediate image transfer belt was prepared.

The thus prepared intermediate image transfer belt was incorporated in the same full-color copying machine as employed in Example 1 and color copies were made. The result was that high quality color images free from image transfer dust and the deposition of toner on the background of images were obtained.

The electric resistance in the direction of the external surface of the intermediate image transfer belt prepared in Example 2 measured about $10^9$ Ω, while the electric resistance in the direction of the thickness of the intermediate image transfer belt measured $5 \times 10^8$ Ω.

EXAMPLE 3

In this example, as the electroconductive material, a crushed carbonized material 3c was employed, which was prepared by carbonizing spherulites of an organic polymer in an atmosphere of an inert gas, and crushing the carbonized spherulites to a grain size of 1 µm or less. An SEM inspection of the thus prepared crushed carbonized material 3c indicated that pieces of the crushed carbonized material 3c had the same shape as that of the pieces of the crushed selenium 3b employed in Example 2.

The crushed carbonized material 3c and polyamide acid were mixed with a ratio of 0.15:1. This mixture was dispersed in DMAC and diluted with DMAC so as to prepare a polyamide acid solution with a solid component ratio of 30%.

The thus prepared polyamide acid solution was subjected to centrifugal molding on the molding surface 1a of the centrifugal molding cylinder 1. In the course of the centrifugal molding, the grains of the crushed carbonized material 3c in the polyamide acid solution were moved toward the molding surface 1a, with the heavier cone-shaped end portion thereof being directed to the molding surface 1a of the centrifugal molding cylinder 1 in exactly the same manner as in the pieces of the crushed selenium 3b employed in Example 2, by the centrifugal force of the rotating molding surface 1a of the centrifugal molding cylinder.

In the above, the grains of the crushed carbonized material serving as the electroconductive material were more easily arranged so as to be directed in the direction of the thickness of the endless belt film than in the case of the endless belt film shown in FIG. 2 in Example 1.

The state of the grains of the crushed carbonized material 3c in the endless belt film was the same as that of the crushed pieces of selenium 3b in the endless belt film 2-2 as shown in FIG. 4, so that a figure showing the state of the grains of the crushed carbonized material 3c in the endless belt film is omitted.

The thus molded endless belt film was dried and cured, whereby an intermediate image transfer belt was prepared.

The thus prepared intermediate image transfer belt was incorporated in the same full-color copying machine as employed in Example 1 and color copies were made. The result was that high quality color images free from image transfer dust and the deposition of toner on the background of images were obtained.

The electric resistance in the direction of the external surface of the intermediate image transfer belt prepared in Example 2 measured about $10^9$ Ω, while the electric resistance in the direction of the thickness of the intermediate image transfer belt measured $5 \times 10^8$ Ω.

Conventional intermediate image transfer belts without anisotropy with respect to electric resistivity will now be explained as comparative examples.

Comparative Example 1

A commercially available spherical carbon black serving as an electroconductive material, and polyamide acid were mixed with a ratio of 0.15:1. This mixture was dispersed in DMAC and diluted with DMAC so as to prepare a polyamide acid solution with a solid component ratio of 30%.

The thus prepared polyamide acid solution was subjected to centrifugal molding on the molding surface 1a of the centrifugal molding cylinder 1.

Figure 5:
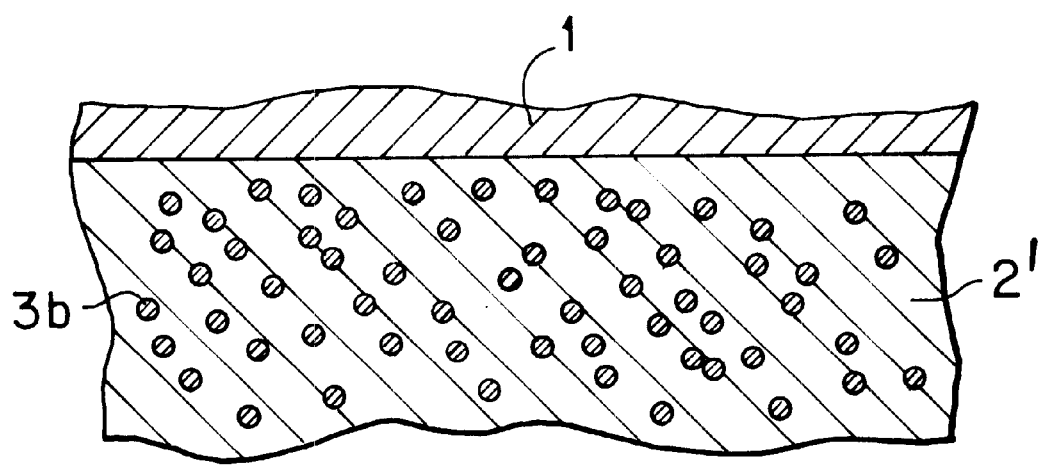
FIG. 5 is a schematic partial cross-sectional view of a comparative endless belt film 2' prepared in Comparative Example 1, using the centrifugal molding cylinder 1.

FIG. 5 is a schematic partial cross-sectional view of a comparative endless belt film 2' thus prepared in Comparative Example 1, which was formed in the centrifugal molding cylinder 1.

As shown in FIG. 5, spherical carbon black particles 3d were regularly dispersed in the comparative endless belt film 2'.

The thus molded endless belt film 2' was dried and cured, whereby a comparative intermediate image transfer belt No. 1 was prepared.

The thus prepared comparative intermediate image transfer belt No. 1 was incorporated in the same commercially available full-color copying machine as employed in Example 1, and color copies were made. The result was that there was formed no image transfer dust, but the deposition of toner on the background of images occurred in the obtained images.

The electric resistance in the direction of the external surface of the intermediate image transfer belt prepared in Comparative Example 1 measured about $10^9$ Ω, while the electric resistance in the direction of the thickness of the intermediate image transfer belt measured $5 \times 10^{13}$ Ω.

Comparative Example 2

The procedure of preparing the comparative intermediate image transfer belt No. 1 in Comparative Example 1 was repeated except that the commercially available spherical carbon black serving as the electroconductive material, and polyamide acid were mixed with a ratio of 0.20:1, whereby a comparative endless belt film was prepared in Comparative Example 2. The spherical carbon black particles 3d were dispersed almost in the same manner in the comparative endless belt film 2 as in the comparative endless belt film 2' in Comparative Example 1, so that a figure showing the comparative endless belt film is omitted here. However, the dispersing density of the spherical carbon black particles 3d in the comparative endless belt film was greater than that in the comparative endless belt film 2' in Comparative Example 1.

The thus molded endless belt film was dried and cured, whereby a comparative intermediate image transfer belt No. 2 was prepared.

The thus prepared comparative intermediate image transfer belt No. 2 was incorporated in the same commercially available full-color copying machine as employed in Example 1, and color copies were made. The result was that the deposition of toner on the background of images did not occur in the obtained images, but there was formed image transfer dust.

The electric resistance in the direction of the external surface of the intermediate image transfer belt prepared in Comparative Example 2 measured about $10^8$ Ω, while the electric resistance in the direction of the thickness of the intermediate image transfer belt measured $5\times10^{11}$ Ω.

The following TABLE 1 shows the characteristics of the electric resistance and the quality of the formed image in each of the above-mentioned examples and comparative examples:

TABLE 1

| | Electric resistance (Ω) in the direction of surface | Electric resistance (Ω) in the direction of thickness | State of formed images | |
|---|---|---|---|---|
| | | | Image transfer dust | Deposition of toner on the background of images |
| Ex. 1 | $10^9$ | $5 \times 10^8$ | None | None |
| Ex. 2 | $10^9$ | $5 \times 10^8$ | None | None |
| Ex. 3 | $10^9$ | $5 \times 10^8$ | None | None |
| Comp Ex. 1 | $10^9$ | $5 \times 10^{13}$ | None | Found |
| Comp. Ex. 2 | $10^9$ | $5 \times 10^{11}$ | Found | None |

The results shown in TABLE 1 indicates that when the conditions that the electric resistance in the direction of the surface of the intermediate image transfer belt is greater than that in the direction of the thickness of the intermediate image transfer belt are satisfied, both the formation of the image transfer dust and the deposition of the toner on the background of the images can be reduced.

The measurement of the electric resistance of the intermediate image transfer belt will now be explained.

The conversion from surface resistance to volume resistivity and vice versa will now be explained.

In the case of an isotropic electroconductive thin film with a thickness T [cm], a surface resistance ρs [Ω], and a volume resistivity ρv [Ω·cm], for instance, with reference to a technical article entitled "Resistivity Correction Coefficient" (published by Mitsubishi Yuka Co., Ltd.), it is known that the following relationship holds between the thickness T [cm], the surface resistance ρs [Ω], and the volume resistivity ρv [Ω·cm]: ρs=ρv/T From the above formula, the surface resistance can be converted into the volume resistivity and vice versa.

In the present invention, the surface resistivity and the volume resistivity were measured in accordance with the respective procedures defined in the Japanese Industrial Standards (JIS K 6911 5.13.1).

More specifically, the surface resistivity was measured by connecting an outer ring face electrode and an inner circular disc face electrode on a test piece, using an insulating resistance measuring apparatus specified in JIS K 6911 5.12, under the conditions as defined in JIS K 6911 5.13.

The volume resistivity was measured by connecting a face electrode and a back electrode of the test piece, using the above-mentioned insulating resistance measuring apparatus, under the conditions as specified in JIS K 6911 5.13.

Other methods as specified in the Japanese Industrial Standards (JIS 3256) can also be used for measuring the surface resistivity and the volume resistivity.

Figure 6A:
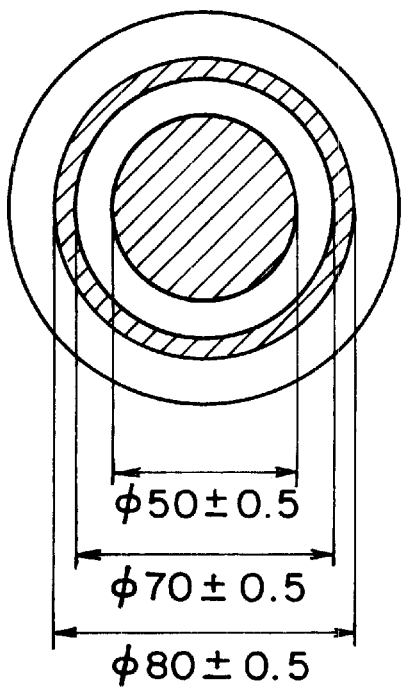
FIG. 6A is a schematic plan view of a face electrode in the arrangement of electrodes in resistivity test specified in JIS K6911 5.13.1.
Figure 6B:
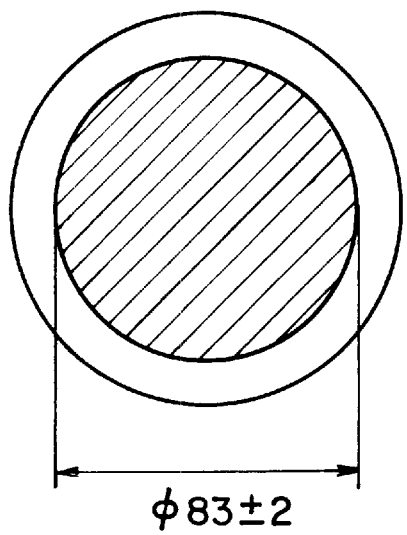
FIG. 6B is a schematic plan view of a back electrode in the arrangement of electrodes in resistivity test specified in JIS K6911 5.13.1.

The Japanese Industrial Standards (JIS K 6911 5.13.1) are as follows:

FIG. 6A is a schematic plan view of a face electrode, and FIG. 6B is a schematic plan view of a back electrode. In these figures, the unit of the dimensions is mm.

Figure 7A:
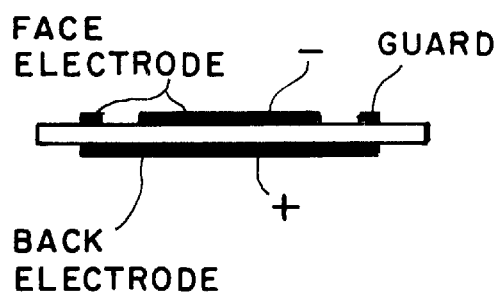
FIG. 7A is a diagram in explanation of the connection of electrodes in a volume resistivity test specified in JIS K6911 5.13.1.
Figure 7B:
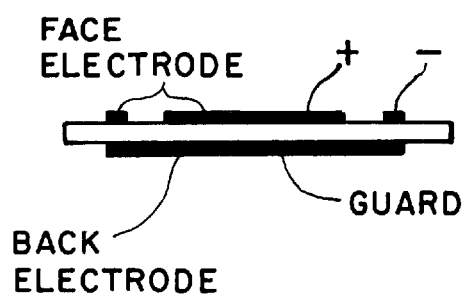
FIG. 7B is a diagram in explanation of the connection of electrodes in a surface resistivity test specified in JIS K6911 5.13.1.

FIGS. 7A and 7B respectively show an arrangement of the electrodes in a volume resistivity test and an arrangement of the electrodes in a surface resistivity test of the Japanese Industrial Standards (JIS K 6911 5.13.1).
(1) Apparatus
(1.1) A Conductive Rubber Cut into the Shape Shown in FIG. 6A and FIG. 6B by Hatching, or a Moisture Permeable Conductive Paint.
(1.2) A Power Source, Insulation Resistance Measuring Instrument and Switches in (1.1.2) through (1.1.4) of 5.12.1 of the Japanese Industrial Standards (JIS K6911 5.12.1).
(1.3) Micrometer Calliper
The micrometer calliper for external measurement specified in JIS B 7502 or one with an accuracy at least equivalent.
(1.4) Vernier Calliper
The vernier calliper for external measurement specified in JIS B 7507 or one with an accuracy at least equivalent.
(2) Test Piece
Use a test piece molded into a disc about 100 mm in diameter and 2 mm in thickness.
(3) Preconditioning
Precondition the test pieces under C-$90^{+4}_{-2}$ h/20±2° C./(65±5) % RH.
(4) Procedure
Measure the thickness of the test piece finished with conditioning, with the micrometer calliper for external measurement accurate to 0.01 mm, and press the conductive rubber upon the test piece in the positions shown in FIG. 6A and FIG. 6B to be the electrodes.

Alternatively, the electrodes may be provided by painting on the test piece with the moisture permeable conductive paint shown in FIG. 6A and FIG. 6B. In this case, treat the test piece after painting the electrodes paying attention so that the moisture permeable conductive paint does not peal off from the test piece during operation.

Measure the outside diameter of inner circle of face electrode and the inside diameter of ring electrode with the vernier calliper to the nearest 0.02 mm. Make connections shown in FIG. 7A for measuring volume resistivity and shown in FIG. 7B for measuring surface resistivity. Connect this assembly in the position of test piece in the same circuit as that given in 5.12, charge it for 1 min and measure the volume resistivity and surface resistivity.

In the above, carry out the tests under the condition in 5.1 (1) [20±2° C. temperature, (65±5) % relative humidity].
(5) Calculation
Calculate volume resistivity and surface resistivity by the following equations:

$$\rho v=(\pi d^2/4T)\times Rv$$

$$\rho s=\{\pi(D+d)/(D-d)\}\times Rs$$

where
ρv: volume resistivity (MΩcm)
ρs: surface resistivity (MΩ)
d: outside diameter of inner circle of face electrode (cm)
t: thickness of test piece (cm)
Rv: volume resistance (MΩ)
D: inside diameter of ring electrode on face (cm)
Rs: surface resistance (MΩ)
π: ratio of circle's circumference to its diameter=3.14

The following is a portion of 5.12.1 of JIS K 6911. FIG. 8 is a diagram of Insulation resistance measuring apparatus specified in (1.1) of JIS K 6911 5.12.1.

(1.1) Insulation Resistance Measuring Apparatus

An apparatus consisting of electrodes, power source, galvanometer, universal shunt, switches, etc. as exemplified in FIG. 8.

(1.1.1) Electrodes

The brass taper pins of Class B specified in JIS B 1352, with 5 mm diameter and free from scars on the surfaces.

(1.1.2) Power Source

A dry or storage battery at 500 V d.c. voltage. A power source from rectified a.c. may be used, provided that it is certain that it keeps a certain d.c. voltage.

(1.1.3) Insulation Resistance Measuring Instrument (1.1.3.1) Measuring Insulation Resistance of not less than 1 MΩ but less than $10^6$ MΩ (Comparison Method)

The standard resistance shall be of 1 MΩ manganese or one with an accuracy at least equivalent, and the universal shunt shall be accurate enough for adjusting the deflection and measuring range of the galvanometer.

A galvanometer can measure a resistance of less than $10^6$ MΩ with ±10% accuracy, if it is highly sensitive with stable zero point as to show 1 mm deflection at 1 m distance by a current of $10^{-10}$ A.

(1.1.3.2) Measuring Insulation Resistance of not more than 5 MΩ

Use the insulation resistance tester specified in JIS C 1302.

(1.1.3.3) Measuring Insulation Resistance of not less than 1 MΩ but less than $10^8$ MΩ

Use an apparatus having a d.c. amplifier calibrated to ±10% accuracy.

(1.1.4) Switches

Switches properly insulated and protected.

The following is JIS R 3256 3, in which another method of measuring electric resistivity is specified.

FIG. 9 is a diagram showing the method of measuring surface resistivity.

3 Measuring Method at Ordinary Temperature 3.1 Principle of Measurement

Apply voltage to the surface of test piece using the measuring circuit composing of an electrode—test piece system X, d.c. power source E, d.c. voltmeter V and ammeter A as shown in FIG. 9 and calculate the surface resistivity by the formula specified in 3.5 from the value of surface electrical resistance obtained by dividing this applied voltage by the current flowing on the surface of test piece.

As a simplified measuring device for surface resistivity in which the equipment shown in FIG. 9 is intergrated into one set, high isolation resistance meters are commercially available.

3.2 Measuring Condition and Applied Voltage

The measurement shall be carried out after allowing the test piece to stand at least for 16 hours in the room conditioned at (20±2)° C. in temperature and (50±5) % in relative humidity.

The applied voltage to the test piece shall be 1,000 V or lower and the standard voltage shall be 500 V.

The duration of voltage application shall be one minute normally and varied according to quality of the glass substrates.

3.3 Preparing Method of Test Piece

The test piece shall be prepared as follows:

(a) Shape and Dimension

The test piece shall be a rectangle one side of which is 50 mm or more or a disk whose diameter is 50 mm or more.

(b) Surface Condition of Test Piece

The test piece of mirror finish or similar surface condition shall be used.

(c) Washing and Drying

The test piece shall be washed at first by rubbing using neutral detergent followed by rinsing using waterworks and then by ultrasonic cleaning within such solvent as extra pure water, acetone, ethanol, etc.

Drying may be made by using an oven or by natural drying.

(d) Methods for Forming Electrode on Test Piece

The formation of electrode on the test piece shall be done by vaporization or sputtering of conductive material, or the like. Gold, platinum, etc. are used as the conductive material but gold is preferable for this measuring method.

In this measuring method high insulation resistance is measured, therefore, it is necessary to form a guard electrode in order to remove stray current in the electrode—test piece system.

(e) Dimension of Electrodes

Figure 10A:
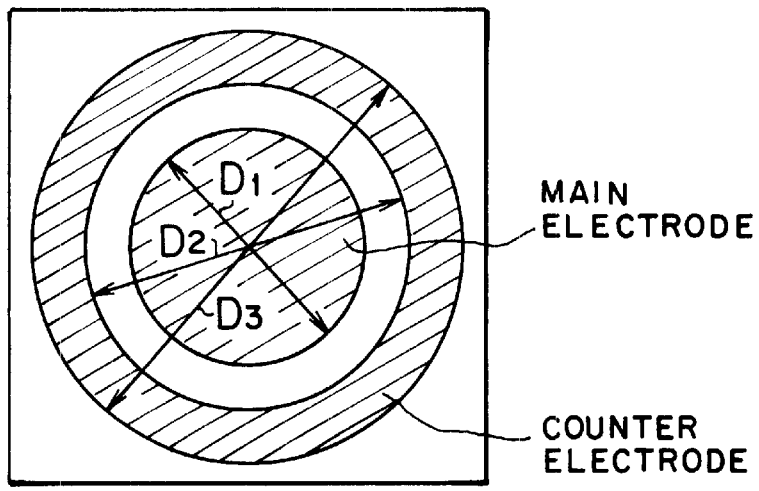
FIG. 10A is a plan view diagram in explanation of an example of a method for forming electrodes on a test piece for use in a method of measuring surface resistivity specified in JIS R 3256 3.
Figure 10B:
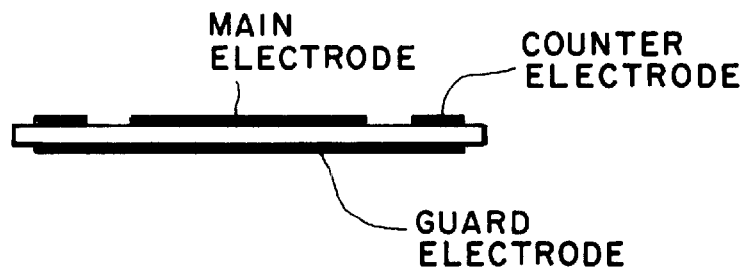
FIG. 10B is a front view diagram in explanation of the example of the method for forming electrodes on a test piece specified in FIG. 10A.

The electrodes arranged to form concentric circles as shown in FIG. 10A and FIG. 10B shall be used. In this arrangement, the size of gap may be adjusted by altering the dimension of the main electrode within a range of approximately 26 mm to 36 mm, taking sensitivity of the measuring device into account.

3.4 Measuring Procedure (a) Form the electrodes on the test piece in accordance with the method shown in FIG. 10A and FIG. 10B and measure the diameter $D_1$ of the main electrode and the internal diameter $D_2$ of the counter electrode at an accuracy of 0.05 mm using the vernier callipers specified in JIS B 7507 or the measuring instruments at least equivalent thereto in accuracy.

(b) After drying the test piece for at least two hours at approximately 120° C., cool it in a desiccator.

(c) Measure the surface resistivity by the measuring method of surface resistivity shown in FIG. 9 under the measuring conditions and applied voltage given in 3.2. The measuring device should be maintained in an ultra high resistance measuring box shielded.

3.5 Calculation and Number of Measurements

The surface resistivity of the glass substrate shall be calculated by the following formula;

$$\rho s [\Omega] = (Dm\pi/g) Rs$$

where,

ρs: surface resistivity (Ω)

Rs: surface electrical resistance (Ω)

Dm: average diameter $(D_1+D_2)/2$ (mm)

$D_1$: diameter of main electrode (mm)

$D_2$: internal diameter of counter electrode (mm)

g: gap $(D_2-D_1)/2$ (mm)

The measurements shall be carried cut twice and the average value of the measurements shall be taken as the value of surface resistivity.

Figure 11:
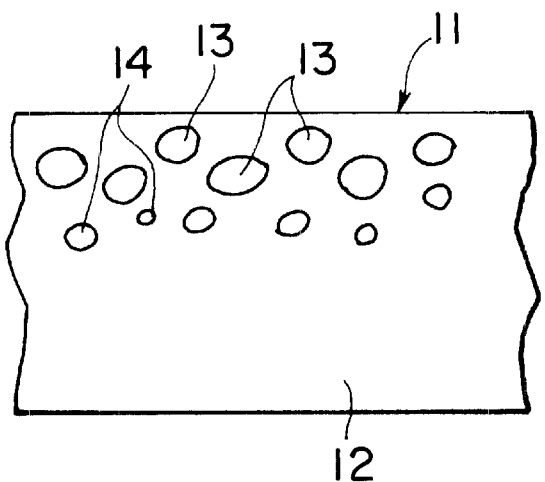
FIG. 11 is a schematic partial cross-sectional view of another example of an intermediate image transfer belt of the present invention.

FIG. 11 is a schematic partial cross-sectional view of an intermediate image transfer belt 11, which is another example of the intermediate image transfer belt of the present invention.

As shown in FIG. 11, the intermediate image transfer belt 11 comprises a substrate 12 and a plurality of first carbon particles 13 and a plurality of second carbon particles 14. The first carbon particles 13 have a lower electroconductivity than that of the second carbon particles 14, and have a larger particle size than that of the second carbon particles 14.

Furthermore, as shown in FIG. 11, the presence of the first carbon particles 13 is localized on the side of the external surface of the intermediate image transfer belt 11, so that the external surface of the intermediate image transfer belt 11 is caused to have high resistivity, which is advantageous to obtain high quality image. Furthermore, the intermediate image transfer belt 11 has a single-layer structure and therefore does not have such a shortcoming that a conventional two-layer intermediate image transfer belt has, that is, a shortcoming that a surface layer is peeled off a substrate for the surface layer.

For instance, a polymer for use in the intermediate image transfer belt 11 which is used as an intermediate image transfer medium for use in a color copying machine is required to have fire retardance, high strength, and electric stability. As such a polymer, for instance, fluoroplastic and polyimide resin are employed.

In particular, polyimide is a promising material from its strength and triboelectric chargeability. A centrifugal molding method can be given as a method of forming an endless-belt-shaped intermediate image transfer belt, using polyimide resin.

The polyimide resin serving as a basic material for the intermediate image transfer belt can be synthesized from its precursor, polyamide acid. As mentioned above, polyamide acid has the properties of being changed to polyimide with the occurrence of imide ring closure with the application of heat or in the presence of a catalyst, and also of being soluble in a particular solvent. A dispersion of carbon particles with different particle sizes in the solution of polyamide acid in a particular solvent is hereinafter referred to as a mixed polyamide acid solution.

Carbon can be classified into acetylene black, oil furnace black, thermal black, and channel black. Acetylene black can be obtained by subjecting acetylene to pyrolysis in a preheated furnace. Oil furnace black can be obtained by injecting petroleum into a furnace, subjecting the petroleum to incomplete combustion with the adjustment of the amount of air to be supplied to form carbon, cooling the thus formed carbon, and collecting the carbon, using a cyclone. Thermal black can be obtained by subjecting a natural gas to alternate heat accumulation and pyrolysis at 200° C. to 1700° C. in a heat accumulation furnace. Channel black can be obtained by blowing a fire of a natural gas against a narrow iron plate so as to deposit carbon on the iron plate.

It is unnecessary to select a particular carbon from the above carbons for use in the intermediate image transfer belt of the present invention. However, it should be avoided that carbon capable of imparting high electroconductivity even in a small amount to the intermediate image transfer belt, such as acetylene black (made by Denki Kagaku Kogyo Kabushiki Kaisha) and Ketjen Black EC (made by Lion Corporation), is localized near the surface of the intermediate image transfer belt when it is desired to set the surface of the intermediate image transfer belt at high surface resistivity.

The carbon can be dispersed in the organic solvent, using dispersion means, such as an ultrasonic dispersion means, a ball mill or a sand mill. Generally, the carbon is not directly dispersed in the polyamide acid solution, but is first dispersed in N-methylpyrrolidone (hereinafter referred to as NMP) to prepare a dispersion of the carbon, and the dispersion of the carbon is then mixed with a polyamide acid solution.

For example, in the case where the carbon is dispersed in a solvent, using a sand mill, the particle size of the carbon dispersed in the solvent changes, depending upon the dispersion time, the amount of the medium for the dispersion, the number of revolutions of a disk in the sand mill, and the viscosity of the carbon-dispersed liquid. Therefore, it is necessary to determine the dispersing conditions in advance in accordance with the desired particle size of carbon particles by conducting preliminary experiments.

Thus, a dispersion in which carbon particles with different electroconductivities and with different particle sizes are dispersed is prepared. In this case, the dispersion is conducted in such a manner that carbon particles with a lower electroconductivity are adjusted to have a larger particle size.

A predetermined amount of the mixed polyamide acid solution, which is a mixture of the solution of polyamide acid and the dispersion of carbon particles, is poured into a centrifugal molding cylinder while it is rotated slowly, and the rotation speed is gradually increased thereafter to reach a predetermined rotation speed. The rotation is continued at the predetermined rotation speed for a predetermined period of time.

By this rotation, the mixed polyamide acid solution is subjected to cast molding inside the centrifugal molding cylinder and at the same time, the carbon particles begin to be separated. Carbon particles with larger particle sizes are selectively moved toward the external surface of the intermediate image transfer belt and calized near the external surface, changing the distribution state of the carbon particles in the mixed polyamide acid solution. However, if this rotation is continued with higher rotation speed, or for an extended period of time, even carbon particles with smaller particle sizes also tend to move toward the external surface. In the present invention, it must be avoided that carbon particles with different particle sizes get together near the external surface of the intermediate image transfer belt. Therefore, the number of revolutions and the rotating time of the centrifugal molding cylinder are appropriately set so as to avoid the localization of the carbon particles with different particle sizes near the external surface of the intermediate image transfer belt.

In the course of the rotation of the centrifugal molding cylinder, the organic solvent is caused to evaporate from the mixed polyamide acid solution, and the solidification of the polyamide acid proceeds, whereby a cylindrical film is formed. This evaporation is preferable because it is done in a heated atmosphere, and therefore is carried out more effectively and more quickly than the evaporation in an atmosphere at normal temperature. It is preferable that the inside of the centrifugal molding cylinder, which is a casting mold, be mirror finished with highest precision. The size of the centrifugal molding cylinder should accord with the size of the cylindrical film to be made.

In order to make the thus obtained polyamide acid film satisfy various characteristics such as heat resistance, resistance to chemicals, and mechanical characteristics required, it is necessary to further heat the polyamide acid film to perform the imide ring closure. The imide ring closure is conducted by the application of heat to the polyamide acid film, with complete elimination of any and all solvents remaining in the polyamide acid film by evaporating the solvents. In practice, the imide closure may be carried out by heating the polyamide acid film to a predetermined temperature as it is rotated for a predetermined period of time, right after the casting of the polyamide acid film. Alternatively, the polyamide acid film may be released from the centrifugal molding cylinder, and then set in a different cylindrical mold so as to cover the mold with polyamide acid film, and then heated by heating means using, for example, hot air, whereby a polyimide film can be obtained.

The thus obtained polyimide film can be used as it is or after it is worked appropriately, as a functional member for various applications.

When this polyimide film is used as the intermediate image transfer belt for use in a full-color copying machine, the film is cut in an appropriate size, and if necessary, a skewing stop member is attached to the opposite end portions thereof.

The thus obtained intermediate image transfer belt includes carbon particles with different electroconductivities, with the carbon particles with a lower electroconductivity being localized on the side of the external surface of the intermediate image transfer belt, so that the surface of the intermediate image transfer belt has a higher surface resistivity. The thus obtained intermediate image transfer belt 11 does not have a conventional two-layer structure composed of a substrate and a surface layer, so that the intermediate image transfer belt does not have a shortcoming that the surface layer is peeled off the substrate.

Figure 12A:
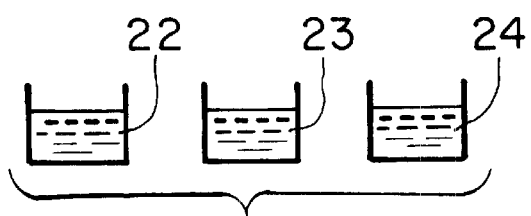
FIGS. 12A to 12F are diagrams in explanation of a method of producing an intermediate image transfer belt of the present invention.

FIGS. 12A to 12F are diagrams in explanation of a method of producing the intermediate image transfer belt of the present invention. In order to produce the intermediate image transfer belt, to begin with, as shown in FIG. 12A, the following are prepared: a starting material 22, which is a 20 wt. % solution of polyamide acid in NMP, a first dispersion 23, which is a dispersion of acetylene black (Trademark "Denka Back", made by Denki Kagaku Kogyo Kabushiki Kaisha) with a particle size of 0.07 μm in NMP, prepared using a sand mill, and a second dispersion 24, which is a dispersion of furnace back (Trademark "Asahi #60", made by Asahi Carbon Co., Ltd.) with a particle size of 0.2 μm in NMP, prepared using a sand mill.

Figure 12B:

As shown in FIG. 12B, the starting material 22, the first dispersion 23 and the second dispersion 24 are mixed to prepare a polyamide acid mixed solution 21. The composition of the polyamide acid mixed solution 21 is such that the solid component content of "Denk Black" is 6 phr and the solid component of "Asahi #60" is 4 phr with respect to the solid component of the polyimide.

Figure 12C:
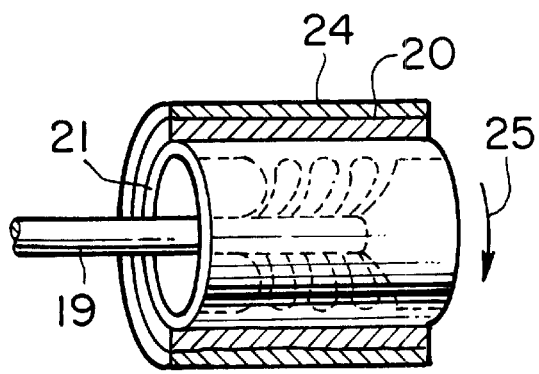

As shown in FIG. 12C, the polyamide acid mixed solution 21 is injected into a centrifugal molding cylinder 20 with an inner diameter of 100 mm and a length of 250 mm through an injection tube 19. The centrifugal molding cylinder 20 is rotated at 10 rpm in the direction of the arrow 25 when the polyamide acid mixed solution 21 is injected thereinto. This rotating speed is maintained until the injection of the polyamide acid molding solution 21 is finished.

Figure 12D:
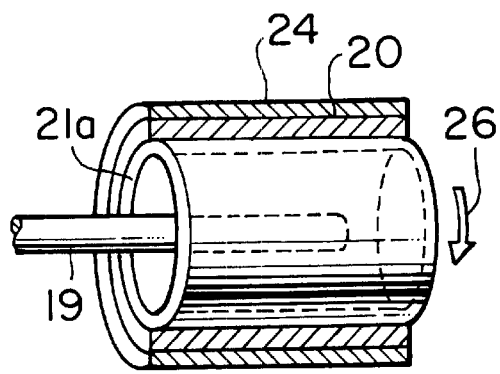

As shown in FIG. 12D, when the injection of the polyamide acid molding solution 21 has been finished, the number of revolutions of the centrifugal molding cylinder 20 is increased up to 400 rpm in the direction of the arrow 26, and thereafter the centrifugal molding cylinder 20 is gradually heated to 100° C., using a sheet-shaped heater 24, and the temperature is maintained. Thus, the solvent is caused to evaporate from a polyamide acid solution layer 21a formed on an inner peripheral surface of the centrifugal molding cylinder 20. As a matter of course, the centrifugal molding cylinder 20 may be heated by heating means other than the above-mentioned sheet-shaped heater 24, such as a heating furnace.

Figure 12E:
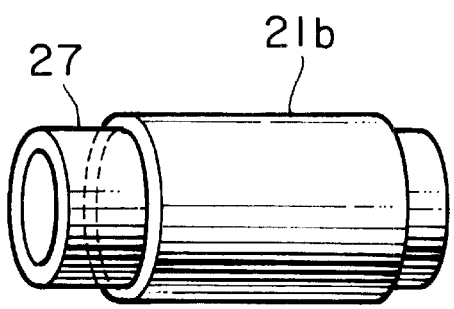

When the solvent has been sufficiently caused to evaporate from the polyamide acid solution layer 21a, a polyamide acid belt 21b is formed. The polyamide acid belt 21b is removed from the centrifugal molding cylinder 20, and mounted on a mold 27 for changing the polyamide acid belt 21b to a polyimide belt as shown in FIG. 12E.

Figure 12F:
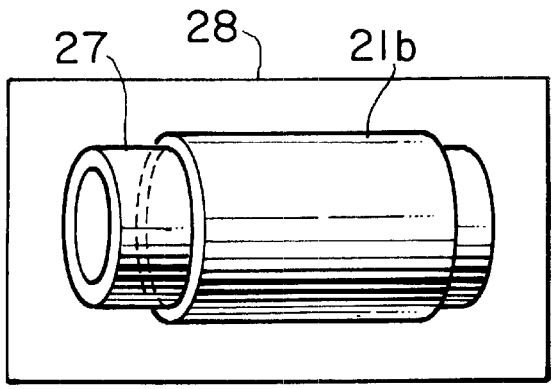

As shown in FIG. 12F, the mold 27, with the polyamide acid belt 21b being mounted thereon, is placed in a furnace 28 in which the temperature is maintained at 300° C., and the polyamide acid belt 12b is heated for 20 minutes, whereby an aromatic polyimide belt is obtained.

Figure 13A:
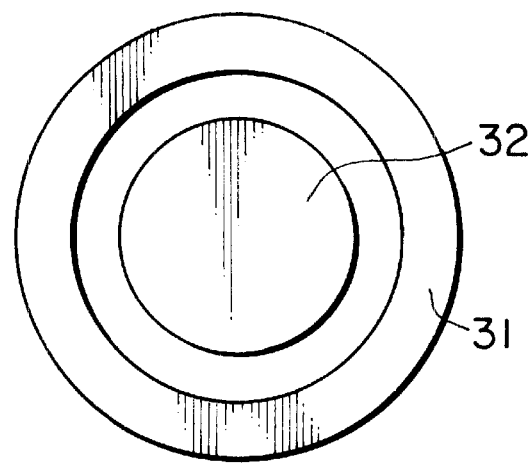
FIG. 13A is a schematic plan view of electrodes for measuring surface resistivity.
Figure 13B:
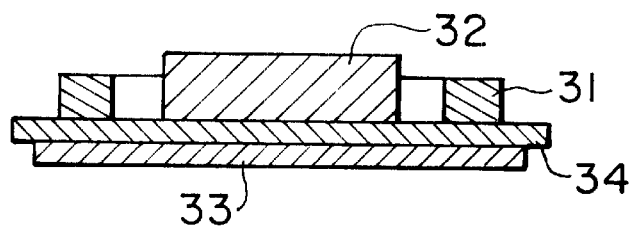
FIG. 13B is a schematic cross-sectional view of the electrodes shown in FIG. 13A.

The surface resistivity at a face side and that of a back side of the aromatic polyimide belt are measured, using electrodes shown in FIG. 13A and FIG. 13B, in accordance with the procedure described in the Japanese Industrial Standards (JIS-K 6911).

In this measurement, a ring electrode 31 and a cylindrical electrode 32 are placed concentrically on a test piece 34 as shown in FIG. 13A and FIG. 13B. In the measurement, a grounding electrode 33 is disposed on a back side of the test piece 33. When a surface resistivity between the ring electrode 31 and the cylindrical electrode 32 is Rs, the surface resistivity ρs is:

$$\rho s = 18.85 \ Rs[\Omega]$$

The surface resistivity at the face side of the aromatic polyimide belt, ρsA and that at the back side of the aromatic polyimide belt, ρsB, measured by the above-mentioned method, are respectively as follows:

$$\rho sA = 6 \times 10^{14} \ \Omega \text{ and } \rho sB = 3 \times 10^7 \ \Omega$$

In the method of producing the intermediate image transfer belt of the present invention, carbon particles with different particle sizes are mixed with the base material for forming the substrate of the intermediate image transfer belt, and the mixture is then subjected to the centrifugal molding, whereby carbon particles with larger particle sizes are localized to a surface side of the intermediate image transfer belt, thus regions with different electroconductivities are formed in the direction of the thickness of the intermediate image transfer belt.

Furthermore, when as the carbon particles with larger particle sizes, carbon particles with a lower electroconductivity are selectively used, the carbon particles with a lower electroconductivity are localized on an outer side in the course of the centrifugal molding, so that a surface layer with higher resistivity can be formed. Thus, according to the present invention, it is unnecessary to provide a separate surface layer on a substrate as in the conventional method for producing the intermediate image transfer belt, so that the number of production steps can be reduced.

Figure 14:
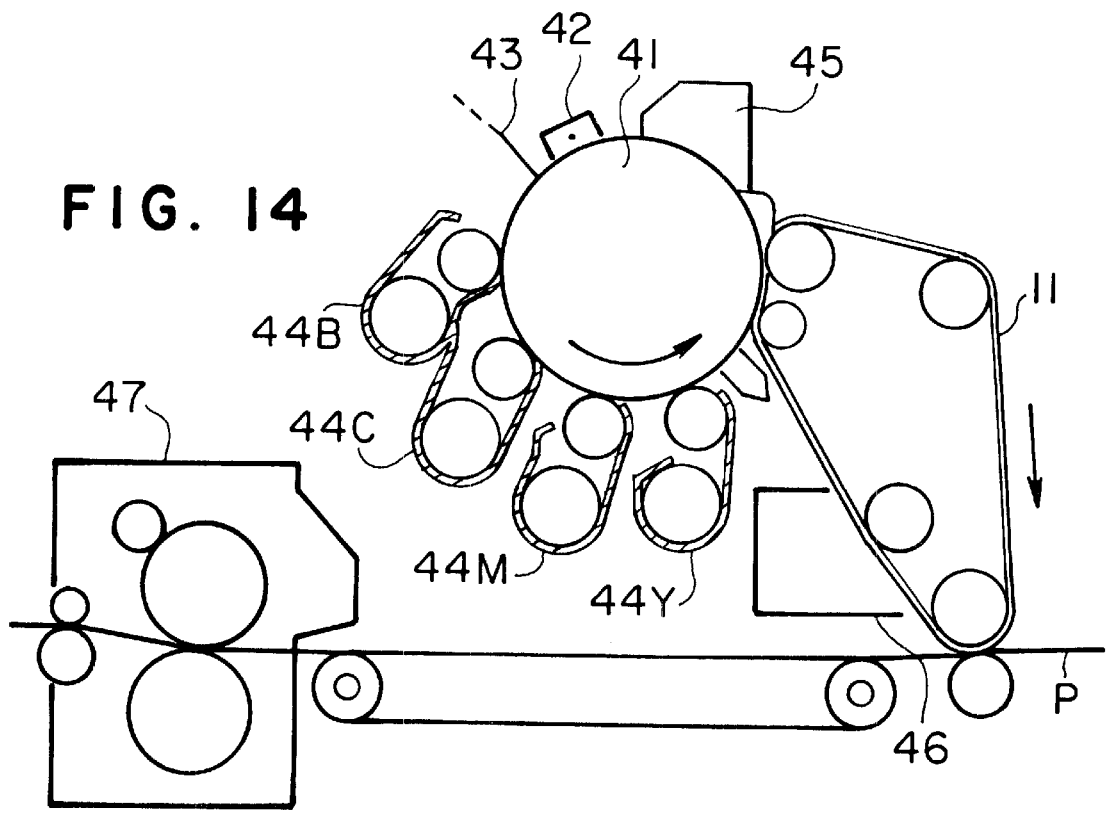
FIG. 14 is a schematic diagram of an image formation apparatus provided with an intermediate image transfer belt of the present invention.

The thus produced intermediate image transfer belt can be used, for example, in an image formation apparatus as shown in FIG. 14.

The image formation apparatus as shown in FIG. 14 is provided with a photoconductor drum 41 serving as a chargeable image bearing member, a charger 42 for charging the photoconductor drum 41, an exposure unit 43 for having the charged photoconductor drum 41 exposed to a light image to form a latent electrostatic image on the photoconductor drum 41, a development apparatus composed development units 44B for development of black, 44C for development of cyan, 44M for development of magenta, and 44Y for development of yellow, for developing the latent electrostatic image to toner images, an intermediate image transfer belt 11 to which the toner images developed on the photoconductor drum 41 are transferred therefrom, a cleaning unit 45 for cleaning the photoconductor drum 41, a cleaning unit 46 for cleaning the intermediate image transfer belt 11, and an image fixing unit 47 for fixing toner images on an image transfer sheet P to which the toner images are secondarily transferred from the intermediate image transfer belt 11.

In the above-mentioned example, the case where two kinds of carbon particles 13 and 14 are dispersed in the substrate 11 has been explained. However, three or more kinds of carbon particles with different particle sizes may be dispersed in accordance with the required electroconductivity.

Japanese Patent Application No. 10-270559 filed Sep. 8, 1998 and Japanese Patent Application No. 11-226277 filed Aug. 10, 1999, are hereby incorporated by reference.

What is claimed is:

1. A film with a single layer structure comprising an insulating matrix resin and an electroconductive material dispersed in the form of needles in said insulating matrix resin, with a longitudinal side of said needles of said electroconductive material being oriented in the direction normal to an external surface of said film, wherein a cross section of each of said needles of said electroconductive material, in the direction normal to said external surface of said film, is in the shape of a quadrilateral with unequal diagonal lines, a longer diagonal line being oriented in the direction normal to said external surface of said film and a shorter diagonal line being oriented in the direction normal to said longer diagonal line.

2. The film as claimed in claim 1, wherein said cross section of each of said needles of said electroconductive material, in the direction normal to said external surface of said film, is in the shape of a quadrilateral, wherein said quadrilateral has a pair of equal adjacent sides directed to said external surface of said film, and a pair of equal adjacent sides directed to a back side of said film.

3. The film as claimed in claim 2, wherein said cross section of each of said needles of said electroconductive material, in the direction normal to said external surface of said film, is in the shape of a quadrilateral, wherein said quadrilateral has a pair of equal adjacent sides directed to said external surface of said film and wherein said pair of equal adjacent sides of said quadrilateral directed to said external surface of said film are shorter than said pair of equal adjacent sides of said quadrilateral directed to a back side of said film.

4. The film as claimed in claim 1, wherein the electroconductive material comprises selenium.

5. The film as claimed in claim 1, wherein the electroconductive material comprises carbon.

6. The film as claimed in claim 1, wherein the electroconductive material comprises a first electroconductive material and a second electroconductive material, and wherein the first and second electroconductive materials have different resistivities.

7. The film as claimed in claim 1, wherein the electroconductive material comprises a first electroconductive material and a second electroconductive material, and wherein the first and second electroconductive materials have different particle sizes.

8. The film as claimed in claim 1, wherein insulating matrix resin comprises at least one selected from the group consisting of polyimide, polyether sulfone, polycarbonate, polyester, polyarylate, polyphenylene sulfide, polyamide, polysulfone, polyparabanic acid, fluoroplastic, polyamide imide, polyether imide, thermosetting unsaturated polyester, and epoxy thermosetting resin.

9. The film as claimed in claim 1, wherein the insulating matrix resin comprises polyimide.

10. The film as claimed in claim 1, wherein the insulating matrix resin comprises fluoroplastic.

11. The film as claimed in claim 1, wherein said quadrilateral comprises a pair of adjacent sides, m and m', which are directed to the external surface of said film and a pair of adjacent sides, n and n', which are directed to a back side of said film, which back side is opposite said external surface, and wherein m, m', n and n' satisfy the following relationships:

$m=m'$; and $n=n'$.

12. The film as claimed in claim 1, wherein said quadrilateral comprises a pair of equal sides, in, which are directed to the external surface of said film and a pair of equal adjacent sides, n, which are directed to a back side of said film, which back side is opposite said external surface, and wherein m and n satisfy the following relationship:

$m<n$.

13. A method of producing an endless-belt-shaped film with a single layer structure comprising an insulting matrix resin and an electroconductive material dispersed in the form of particles in said insulating matrix resin, with larger particles of said electroconductive material being positioned on the side of an external surface of said endless-belt-shaped film, and smaller particles of said electroconductive material being positioned on the side of an inner surface of said endless-belt-shaped film, comprising the steps of;

dispersing said electroconductive materials with different particles size in a solution of said matrix resin in a solvent to form a dispersion of said electroconductive materials in said solution of said matrix resin, and subjecting said dispersion to centrifugal molding to localize larger particles of said electroconductive material on the side of the external surface of said endless-belt-shaped film, and to localize smaller particles of said electroconductive material on the side of the inner surface of said endless-belt-shaped film, with removal of said solvent therefrom.

14. A method of forming an image, comprising transferring a toner image to or from a belt comprising the film as claimed in claim 1.

15. A method of making the film as claimed in claim 1, comprising centrifugal molding a dispersion comprising said electroconductive material and a solution of said matrix resin, and forming the film as claimed in claim 1.

* * * * *